United States Patent [19]
Able

[11] Patent Number: 6,145,229
[45] Date of Patent: Nov. 14, 2000

[54] CARD LIGHTING DEVICE

[76] Inventor: Roy Eugene Able, 4310 Minnetonka Blvd., #410, St. Louis Park, Minn. 55416

[21] Appl. No.: 08/816,211

[22] Filed: Mar. 12, 1997

Related U.S. Application Data

[60] Provisional application No. 60/013,977, Mar. 15, 1996.

[51] Int. Cl.[7] .................................................. G09F 13/00
[52] U.S. Cl. ............................................... 40/446; 40/714
[58] Field of Search ............................. 40/442, 574, 714, 40/716, 779, 781, 559, 560, 561, 562, 715

[56] References Cited

U.S. PATENT DOCUMENTS

| | | | |
|---|---|---|---|
| 1,759,544 | 5/1930 | Croes | 40/715 |
| 2,029,221 | 1/1936 | Burgess | 40/574 |
| 2,513,576 | 7/1950 | Luray | 40/562 |
| 2,549,928 | 4/1951 | Reefe | 40/714 |
| 3,013,475 | 12/1961 | Spangler | 40/574 |
| 4,390,234 | 6/1983 | Embach . | |
| 4,623,215 | 11/1986 | Bazargan . | |
| 4,807,971 | 2/1989 | Nurano . | |
| 4,830,445 | 5/1989 | Robinson . | |
| 5,121,229 | 6/1992 | Benton et al. . | |
| 5,142,384 | 8/1992 | Wood et al. . | |
| 5,296,948 | 3/1994 | Chen et al. . | |
| 5,467,076 | 11/1995 | Ruocco et al. | 340/571 |

FOREIGN PATENT DOCUMENTS

| | | | |
|---|---|---|---|
| 1579382 | 10/1969 | France | 40/574 |
| 2345971 | 12/1977 | France | 40/152.2 |

*Primary Examiner*—Cassandra H. Davis

[57] ABSTRACT

A novelty card lighting device is disclosed. The lighting device is relatively small so as to be hand held and portable. The light is directed at a predefined angle such that the three dimensional illusion of a hologram card is presented to the viewer when the device is hand held at normal arm's length, set upon a surface in front of the viewer, or hung on the wall. The light is swingably mounted in the device and such a swinging is actuated from an exterior portion of the housing. The actuator may be mechanical or include an electromechanical servo. A mount for the novelty card pivots out from the rear of the device for placement of the card in an inset formed in the mount. When the mount swings closed, the novelty card is sandwiched between the mount and a viewing glass covering at least a portion of an opening formed by the housing or frame. The frame about the opening is relatively deep and the mount is formed as a portion of the rear of the device so as to further provide for an illusion of depth to the three-dimensional hologram image. A hood extending over the light concentrates light upon the hologram card and shields the light from the viewer so as to maximize the brightness of the typically dark hologram card.

20 Claims, 8 Drawing Sheets

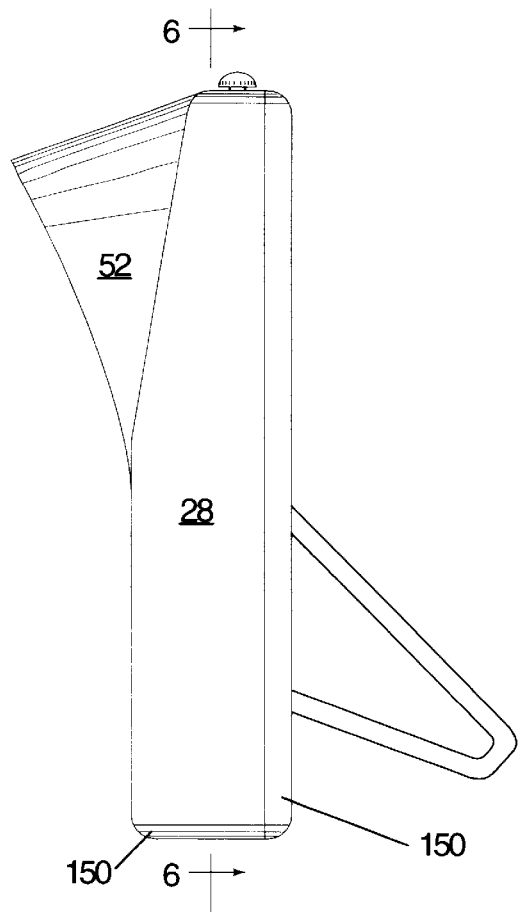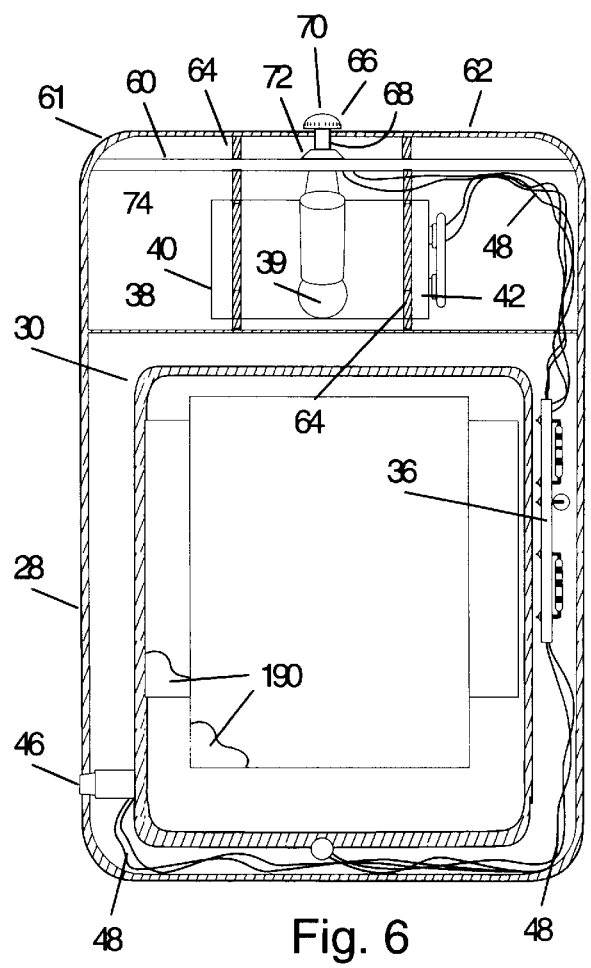

CARD LIGHTING DEVICE

This application claims the benefit under Title 35, United States Code § 119(e) of the United States provisional application No. 60/013,977 filed Mar. 15, 1996 by Roy E. Able and entitled Hologram Lighting Device. Such provisional application No. 60/013,977 is hereby incorporated by reference in its entirety into this application.

BACKGROUND OF THE INVENTION

The present invention relates generally to novelty cards, particularly to devices for lighting novelty cards, and specifically to portable, hand held novelty card lighting devices for novelty cards such as holograms.

Having a hologram is one thing—being able to see it is another. A hologram by its very nature presents a rather dark image, although the details of a hologram may be viewed in direct sunlight, or by shining a strong light directly upon the hologram at a forty-five degree angle. Even a novelty card, especially when in a plastic wrap or envelope, may reflect light cast from overhead and hence be difficult to see.

The presentation of a hologram image is sensitive to at least two factors: the angle of light impinging upon the hologram and the angle from which the hologram card is being viewed. For example, retail stores specializing in selling holograms take care to accurately direct ceiling lights at the proper angle relative to the holograms on display on the walls. However, even with such lighting arrangements, the hologram image may appear to be two-dimensional, out of focus, or disappear from view unless the customer stops immediately in front of the hologram. Further, the three-dimensional image may not be perceptible to the child, who are then lifted by their parents to view the hologram from the proper angle, or to the taller customer who must then bend down to the proper viewing angle.

SUMMARY OF THE INVENTION

A general object of the present invention is to provide a unique portable novelty card lighting device.

Another object of the invention is to provide a unique lighting arrangement for the novelty card device. Specifically, the device includes a light swingable or shuttleable back and forth or side to side in the housing to change the illusion presented by a hologram card. The swinging of the light is preferably caused by an actuator mounted on an exterior portion of the housing. The light is mounted under a hood to concentrate light upon the typically dark hologram card and to shield the light from the eyes of the viewer; the brighter card enhances the three-dimensional effect. The lighting arrangement further includes positioning the mount for the hologram card at or near the rear portion of the housing such that the mount is recessed in the housing and such that the housing itself provides a relatively deep frame about the hologram card. The deep frame further enhances the illusion of depth to the hologram image. A timer is provided to turn off the light after a predefined amount of time.

Another object of the invention is to provide a unique mount for the novelty card device. The mount swings out of the rear of the lighting device to an accessible position for insertion of the card therein, whereupon the mount is swung back into a locking arrangement with the housing of the device. When mount is closed, the novelty card is sandwiched between the mount and a transparent plate which may be disposed over an opening in the housing. The mount is preferably formed in the form of a panel and includes an inset such that the planar novelty card lies in the plane of the mount or at least partially in the plane of the mount and in a plane generally parallel to the plane of the mount. The novelty card lies snugly within the inset so that lateral and longitudinal movement of the novelty card is minimized. The inset is formed in the shape of a cross such that a rectangular novelty card may be displayed in a portrait or landscape view.

An advantage of the present invention is that a novelty card image, especially a hologram card image, is brightened. Features contributing to such an advantage include a light source adjacent to the hologram card, a light source disposed at the proper angle relative to the hologram card, a hood positioned over the light source to concentrate light upon the card and shield the light from the eyes of the viewer, and a mount recessed as deeply as possible within the hologram card. Attendant advantages of brightening the hologram image are that the hologram card may be viewed from a greater distance, and that a change of an illusion presented by a hologram card is more perceptible.

Another advantage is that a moving hologram image or a change of the image is presented without the viewer tilting the device or her head. Instead, the light is readily swung back and forth by an actuator conveniently mounted on the exterior of the device.

Another advantage is that a novelty card is easily insertable into and removable from the device.

Another advantage is that a novelty card is securely and snugly held in the device.

Another advantage is that the device renders novelty cards less prone to theft. Novelty cards are expensive and easily subject to theft by virtue of their relatively small size. However, prospective buyers at card shows, which tend to congested with buyers milling around one's booth, necessarily wish to inspect the card before purchase. By handing the buyer the device in which the card is secured, instead of the plastic wrapped card itself, the rare or valuable novelty card is more easily kept track of by the seller.

These and further objects and advantages of the present invention will become clearer in light of the following detailed description of the illustrative embodiments of this invention described in connection with the drawings.

BRIEF DESCRIPTION OF THE DRAWINGS

FIG. 5 is a side elevation view of the novelty card lighting device of FIG. 2.

FIG. 6 is a section view at lines 6—6 of FIG. 5.

Figure 1:
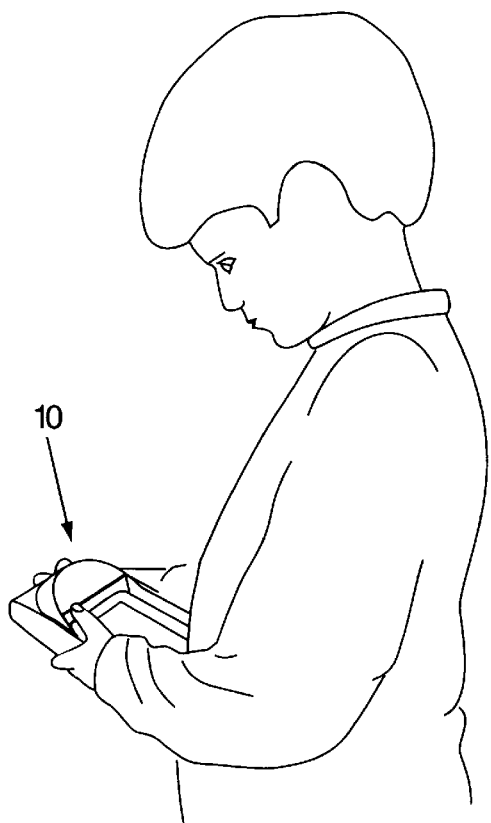
FIG. 1 is an environmental view of the present portable novelty card lighting device indicating the generally preferred size of the device.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "font", "rear", and "side" and similar terms are used herein, it should be understood that these terms have reference only to the structure shown in the drawings as it would appear to a person viewing the drawings and are utilized only to facilitate describing the preferred embodiments.

DESCRIPTION

The present portable novelty card or hologram lighting device is indicated in general by reference numeral 10 in FIG. 1. The device is sufficiently small so as to be hand held and portable by hand. The device 10 is preferably intended to be viewed at an arm's length as shown in FIG. 1. However, the device 10 may be propped up on a desk such as indicated in FIG. 5 or mounted on a wall. The bright illusion presented by the device permits the three-dimensional image of a card such as a hologram to be readily seen from a distance greater than an arm's length.

Figure 2:
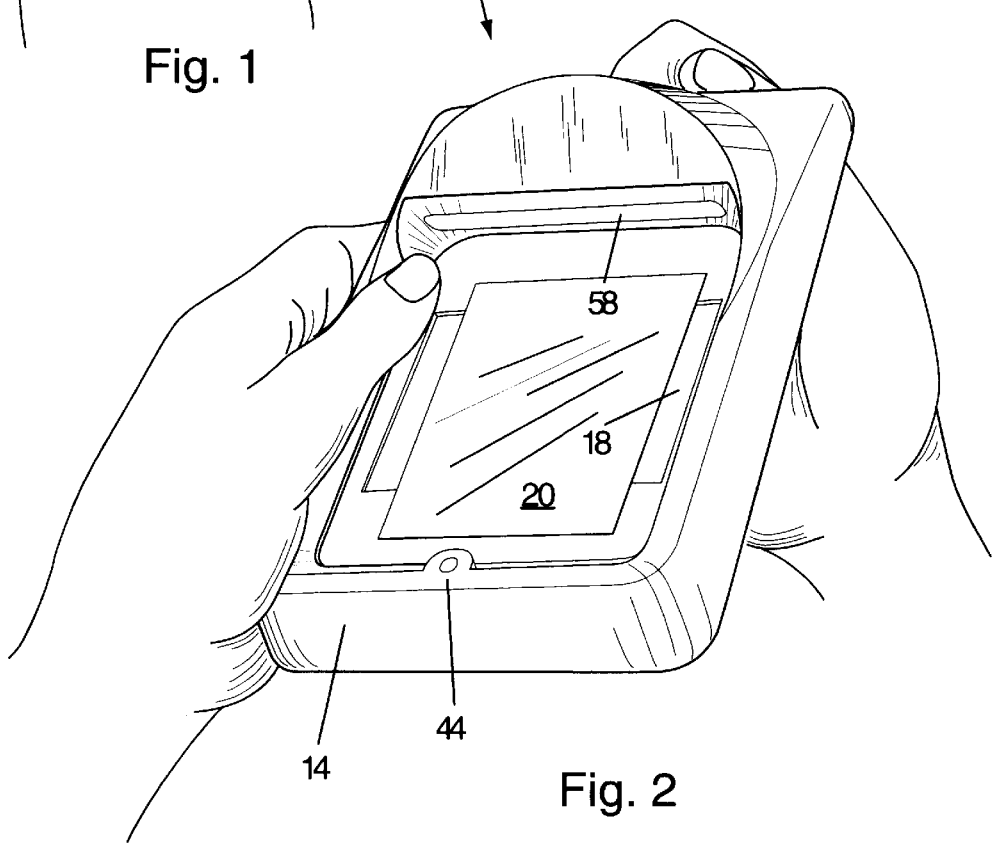
FIG. 2 is a detail perspective view of the novelty card lighting device of FIG. 1 in a closed position.
Figure 3:
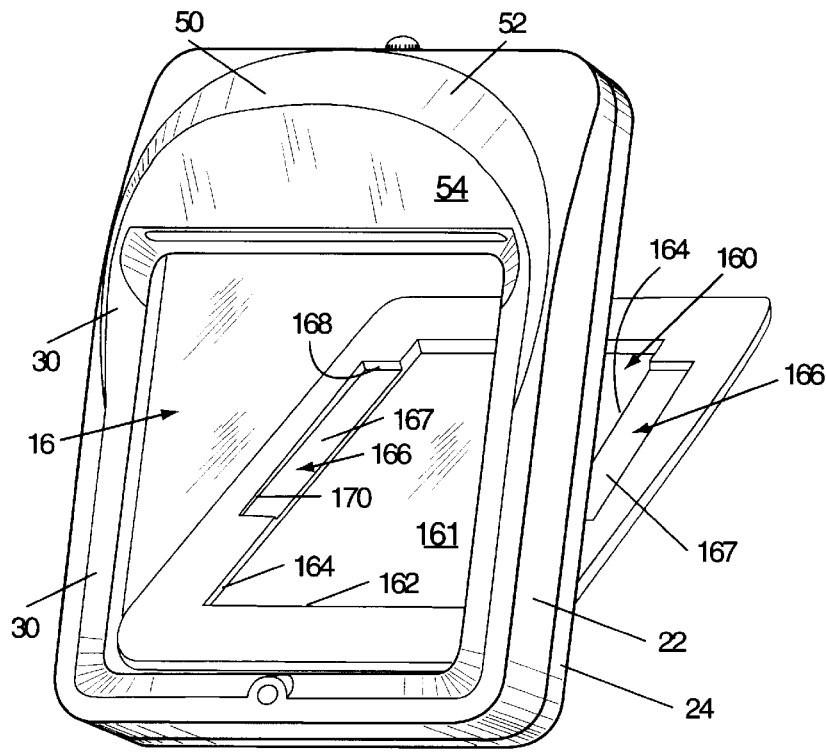
FIG. 3 is a detail perspective view of the novelty card lighting device of FIG. 2 in an open position.
Figure 4:
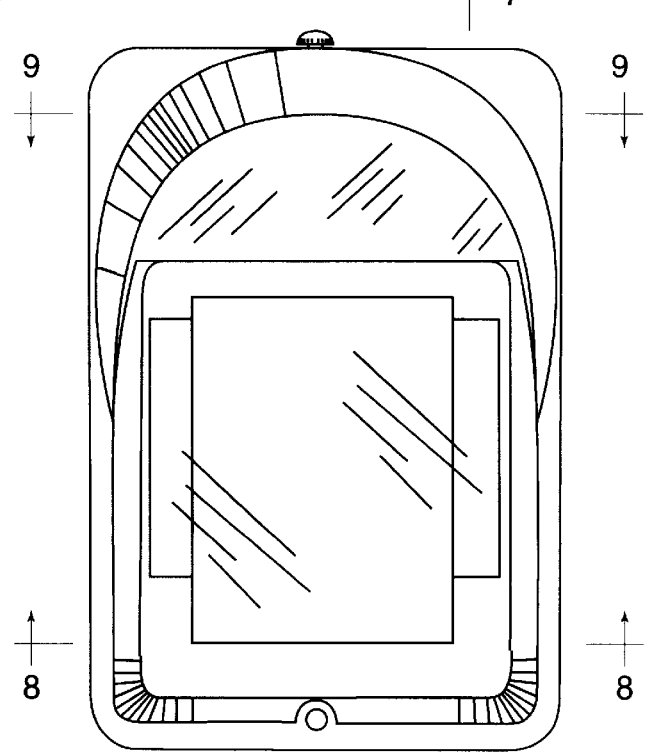
FIG. 4 is a front plan view of the novelty card lighting device of FIG. 2.

As shown in FIGS. 2 and 3, the device 10 includes a housing 14 having an opening 16 for viewing a novelty card such as a hologram card 18 placed in the housing 14. The opening 16 is preferably "covered" by a transparent plate 20 such as glass or a transparent plastic or plexiglass. The plate 20 may extend partially or completely over the opening 16. If desired, the device 10 may not include such a plate 20 over the opening 16.

As shown in FIGS. 2–3, the housing 14 is generally two-piece, including a front portion 22 and a rear or backing portion 24 held together by a set of four corner pin connectors 26. Each of the front and rear portions 22, 24 may be integrally molded. Front portion 24 includes an outer sidewall 28 extending about the front portion 22 and an inner sidewall 30 extending about and defining the opening 16. The outer and inner sidewalls 28 and 30 are joined at their frontmost regions to form a frontmost edge portion 32. Integrally molded outer and inner sidewalls 28, 30 and edge portion 32 form a hollowed out or inside portion 34 of the front housing portion 22 in which a circuit board 36 having a timer, a lighting arrangement 38 having a light bulb 39, a power arrangement 40 having a 9-volt battery 42, an on-off switch 44 for the light and power arrangements 38, 40, and an AC outlet 46 are mounted. The circuit board 36 may be fixed to one of the inner or outer sidewalls 28, 30. Electrical leads 48 may extend in the hollowed out portion 34 among the circuit board 36 and various components 38, 39, 40, 42, 44, and 46.

The front housing portion 22 further includes an integral hood 50 for covering the lighting arrangement 38. The hood 50 includes an integral crescent shaped rear panel 52 and an upper or front hemispherical panel 54 with a lower flange 56. A hood opening 58 for light emanated by the light bulb 39 is formed by and between the flange 56 and inner sidewall 30. Inner sidewall 30 leads up and into hemispherical panel 54 such that the width of hood opening 58 is generally the width of opening 16.

The front housing portion 22 further includes an internal integral transverse support 60 extending to and between opposite corner portions 61 of outer sidewalls 28 and extending parallel to another portion 62 of the outer sidewall 28. Longitudinally extending integral supports 64 extend between transverse support 60 and outer sidewall portion 62. Such longitudinally extending integral supports 64 may also extend between the cross member 60 and inner sidewall 30 and include openings therein for frictionally engaging components such as the battery 42. Such a longitudinally extending member 64 may also have holes for the electrical leads 48 running to the lighting assembly 38. Lugs may extend from the inner face of the panel 94 of the rear housing portion 24 to further support the battery 42.

Figure 9:
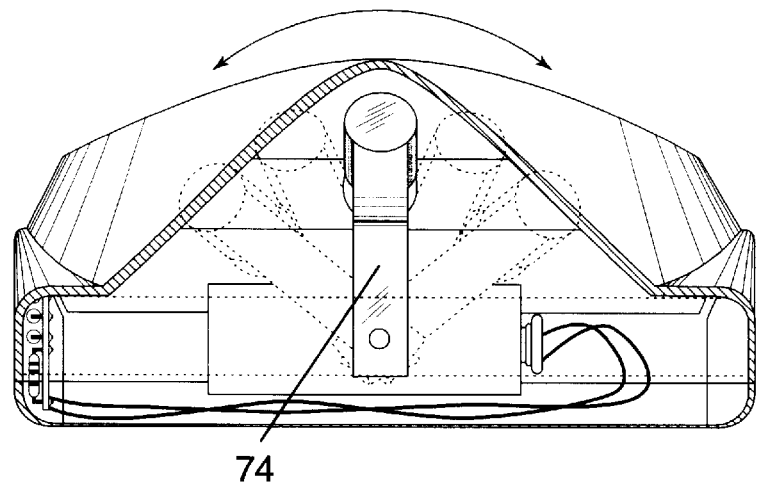
FIG. 9 is a section view at lines 9—9 of FIG. 4.
Figure 10:
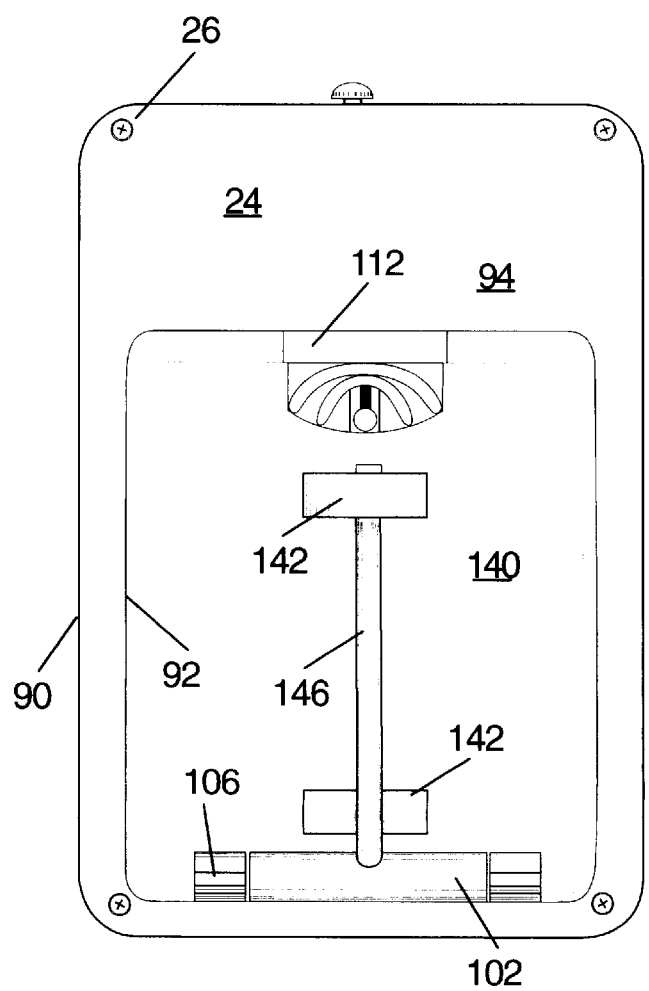
FIG. 10 is a rear plan view of the novelty card lighting device of FIG. 2.

An actuator 66 includes a shaft 68 which extends through outer sidewall portion 62 and transverse support 60. Actuator 66 includes a handle or knob 70 and a bearing or bushing 72 fixed in transverse support 60 for the shaft 68. At its distal end, shaft 68 is affixed to and swings a light assembly mount 74 on which is mounted the light assembly 38. The light assembly 38 includes an internally threaded cylindrical housing 75 into which the light bulb 39 is threaded. Light assembly mount 74 may have channels formed therein for the reception of electrical leads 48 to the lighting assembly 38. The light assembly mount 74 swings at least through the range of motion of an arc shown in phantom in FIG. 9. Such a motion directs light beams sequentially upon a side vertical or longitudinal portion of a hologram card directly, to upon a middle vertical or longitudinal portion of the hologram card directly, and then upon the other side vertical or longitudinal portion of the hologram card directly. As a result of such swinging from side to side, motion may be seen in the hologram card, as shown in FIGS. 14A to 14H. Such a side to side swinging is preferred over merely changing the angle of impingement of light, although such is accomplished as well by the pivotal motion of the lighting assembly 38. As the mount 74 is swung, the angle of impingement, relative to the plane of the hologram card, is greatest when light is impinging upon the middle longitudinal or vertical portion of the hologram card and the least when light is impinging upon the extreme side portion of the hologram card.

Figure 14:
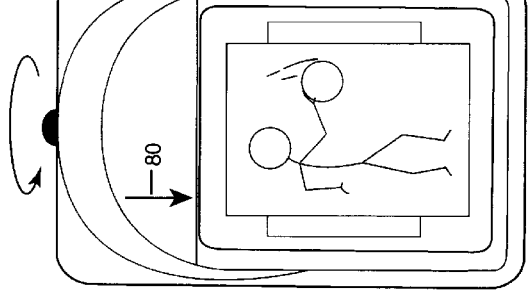
FIGS. 14A–14H show the novelty card lighting device of FIG. 4 holding a hologram card therein and illustrating movement presented by illusions of the card upon actuation of a swinging of a light mounted in the device.
Figure 14:
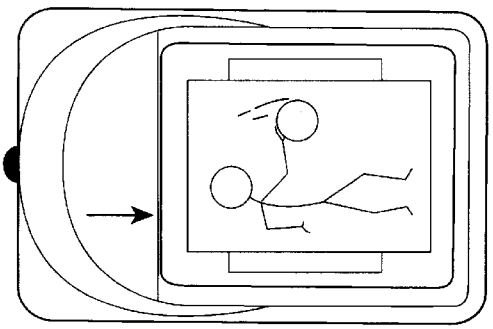
Figure 14:
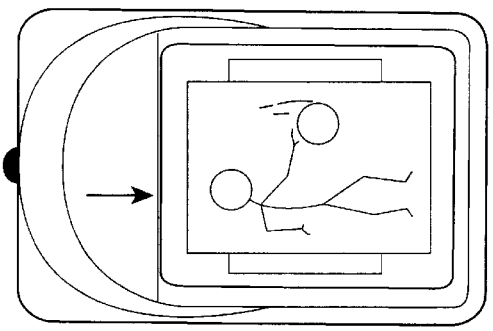
Figure 14:
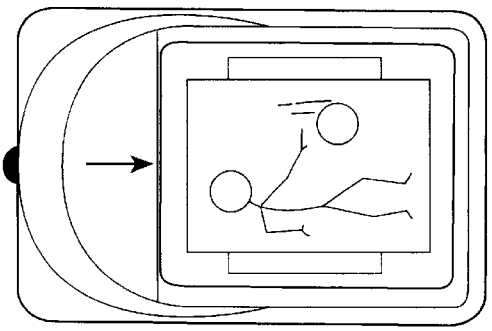
Figure 14:
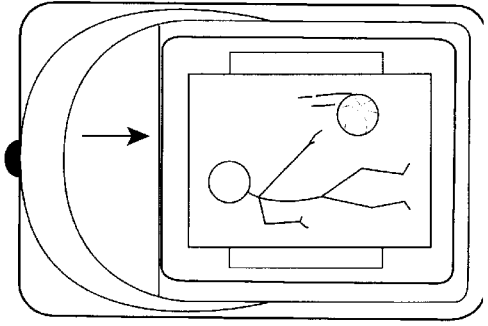
Figure 14:
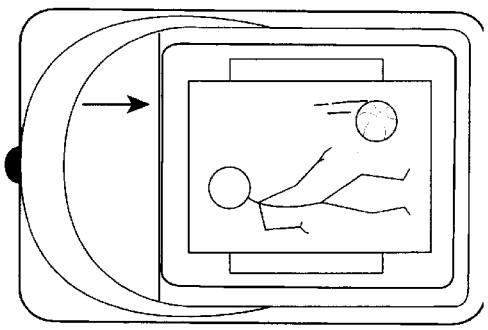
Figure 14:
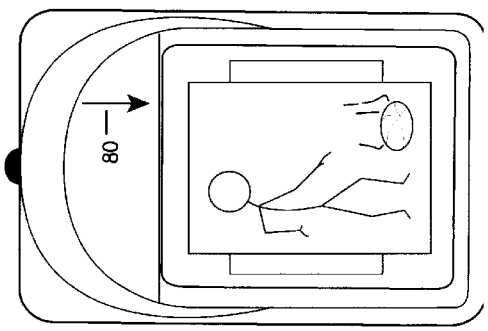
Figure 14:
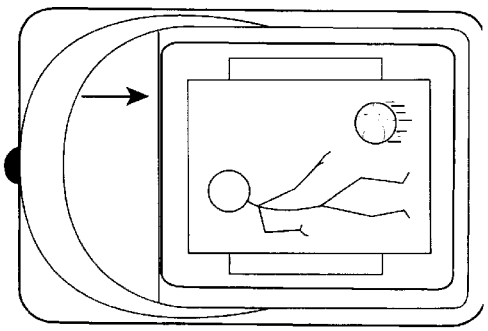

As can further be seen in FIGS. 14A–14H, the movement of the lighting assembly 38 may be described as a shuttling of light from one portion of the hologram card to other portions of the hologram card. Reference numeral 80 indicates the most direct beam of light from the light bulb 39 to the hologram card 18. As can be seen, beam 80 is directed at the most extreme side longitudinal portion of hologram card 18 in FIG. 14A, to the middle longitudinal portion in FIG. 14D, to the other most extreme side longitudinal portion in FIG. 14G. FIG. 14H indicates the knob 70 being turned in the opposite direction to shuttle or pivot the lighting assembly 18 in the opposite direction. With the stick FIG. 82 shown in FIGS. 14A–14H, it can be observed that the motion of the stick figure is continuous or smooth even with reversing the rotation of the knob 70.

Figure 7:
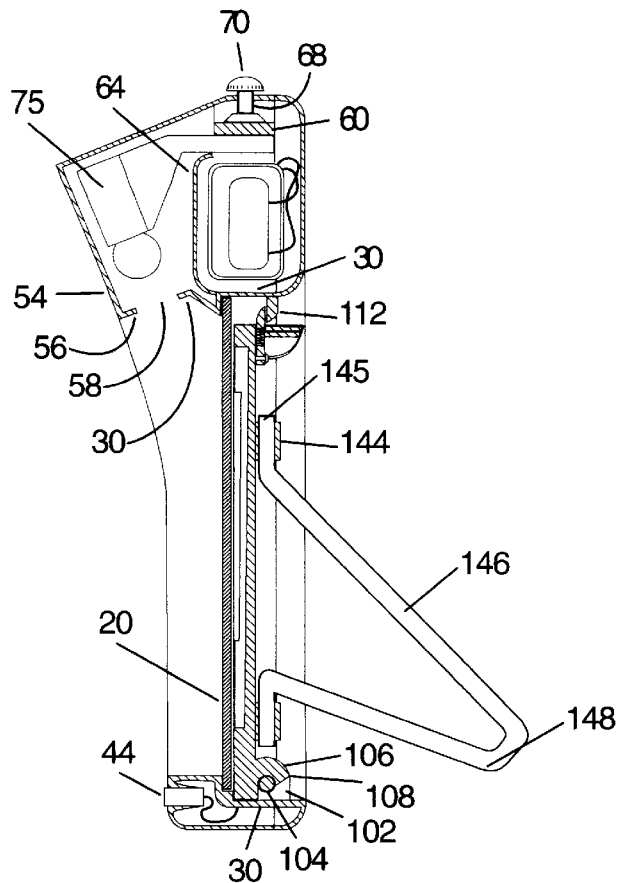
FIG. 7 is a section view at lines 7—7 of FIG. 4.
Figure 8:
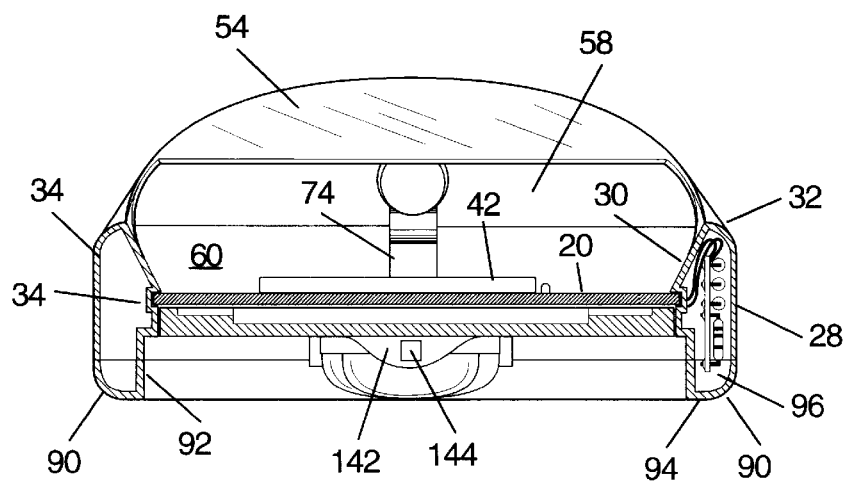
FIG. 8 is a section view at lines 8—8 of FIG. 4.

As shown in FIG. 8, the transparent plate 20 is fixed in a pair of opposing channels 84 formed in the longitudinally extending portions of the inner sidewall 30 so as to fix therein the longitudinally extending edges of the transparent plate 20. As shown in FIG. 7, laterally extending edges of the transparent plate 20 abut laterally extending portions of the inner sidewall 30 so as to minimize longitudinal movement of the transparent plate 20.

Rear housing portion 24 includes an outer sidewall 90 and an inner sidewall 92 which are integral with a rear panel portion 94. Sidewalls 90, 92 and panel portion 94 form a space or channel 96 therein for partially receiving components such as the circuit board 36 and battery 42. At their respective corner portions, rear housing portion 24 and front housing portion 22 may include interior interlocking integral lugs having internal threads for receiving the pin connectors 26. It can be noted that the outer and inner sidewalls 90, 92 of the rear housing portion 24 line up and confront the outer and inner sidewalls 28 and 30 of the front housing portion 22 so as to substantially seal the interior of the housing 14 to moisture.

The housing 14 further includes a swingable mount or receptor 100 for the novelty card 18. Extending from and integral with the inner sidewall 30 of the front housing portion 22 is a first hinge portion 102 having a pin 104. Extending from and integral with the swingable mount 100 is a second hinge portion 106 which engages opposite ends of the pin 104. The second hinge portion 106 includes stops 108 for abutting the inner sidewall 92 of the rear housing portion 24 when the mount 100 swings out for about twenty degrees relative to the rear housing portion 24. Hence the chances of a novelty card 18 falling out from a mount 100 swinging out too far are minimized. A swinging of the mount 100 less than forty-five degrees is preferred, with a swinging of twenty degrees or less being more preferred.

Figure 11:
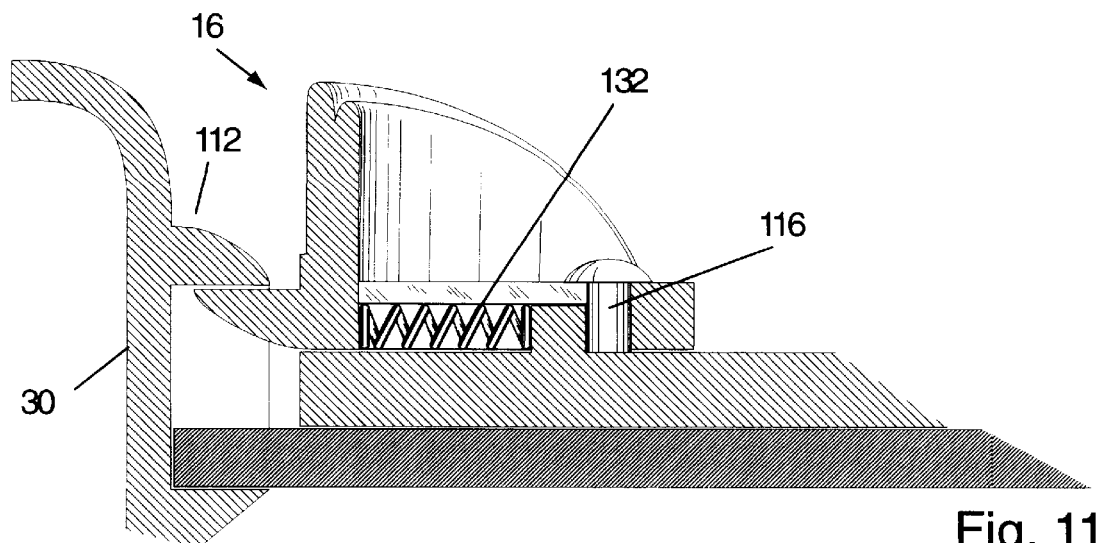
FIG. 11 is a partial section view of a latch arrangement of the novelty card lighting device of FIG. 10 in a closed position.
Figure 12:
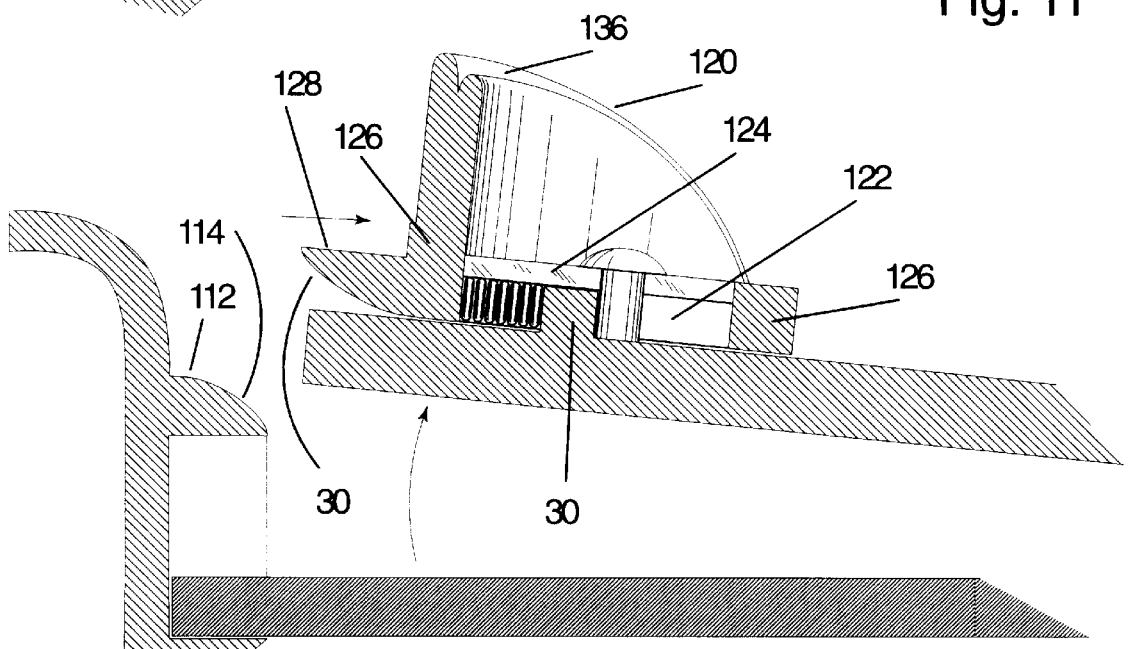
FIG. 12 is a partial section view of a latch arrangement of the novelty card lighting device of FIG. 10 in an open position.
Figure 13:
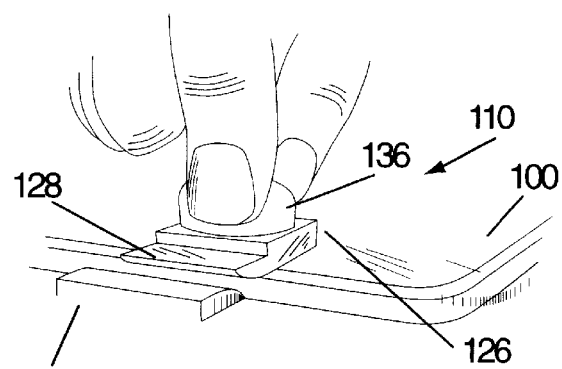
FIG. 13 is a partial, perspective view of the latch arrangement of FIG. 10.

Opposite the hinge portion 106, the mount 100 includes a quick connect and release latch arrangement 10. As shown in FIGS. 11, 12, and 13, the latch arrangement 110 includes a first locking extension 112 integrally extending from the inner sidewall 30 of the front housing portion 22. The first locking extension 112 includes a curved face 114. The latch arrangement 110 further includes a pin 116 fixed to the mount 100. The pin 116 includes a head 118. A sliding latch 120 includes a slot 122 which receives the pin 116. A face 124 of a main body 126 of the latch 120 is confronted by the head 118 of the pin 116 to slidingly fix the latch 120 to the mount 100. The latch 120 includes a second locking extension 128 having a curved face 130. A coil spring 132 is fixed between the main body 126 of the latch 120 and a tab or stop 134 integrally extending from the mount 100. The coil spring 132 is biased to as to bias the latch 120 into a locked or closed position relative to the first locking extension 112. The latch arrangement 110 is a quick connect and release arrangement because engagement of the curved faces 112 and 130 when the mount or door 100 is being closed forces the latch 120 to compress the coil spring 132 until the second locking extension 128 slips past first locking extension 112 whereupon the coil spring 132 extends such that the flat faces of the extensions 112 and 128 confront each other to lock the mount 100 to the housing 14. The latch 120 includes a pair of curved and tapered finger holds 136 to facilitate sliding of the latch 120 during disengagement of the locking extensions 112 and 128, and then to facilitate pulling the mount 100 away from the housing 14 to provide access for the placement of the hologram card 18 therein.

The mount 100 includes a rear face 140 from which integrally extends a pair of lugs 142. Each of the lugs 142 includes a slot or hole 144 square in section for the reception of an end 145 of an easel or leg 146. Each of the easel ends 145 are also square in section and of about the same width as slots 144 such that the easel 146 is self-locking and such that a predefined amount of friction is overcome when rotating the easel 146 between a first locked position where it lays flat on face 140 and a second locked position where it is positioned perpendicular to the rear face 140 of mount 100. To place the lighting device 10 in an upright angled position, the easel 146 is swung out to the perpendicular position, where portion 148 supports the device 10 relative to a surface in cooperation with an elongate bottom edge 150 of the rear housing portion 24. Such forms a three point or three portion arrangement with the elongate bottom edge 150 providing two of the points or portions. If an upright position of ninety degrees is desired for the lighting device 10, the device 10 is set on its flat bottom edge 152 of the front housing portion 22 such as shown in FIG. 5. The easel 146 is easily removable from the device 10 by squeezing it to draw the ends 145 toward each other so as to remove such from their respective slots 144.

The mount 100 further includes a cross-like inset or receptacle 160 for holding the novelty card 18 in the portrait position. The portrait inset 160 includes an elongate face portion 161, and laterally extending edges 162 and longitudinally extending edges 164 to minimize movement of the hologram card 18. A landscape inset 166 includes opposite generally elongate face portions 167 which include laterally extending edges 168 and longitudinally extending edges 170 to minimize movement of the novelty card 18. The portrait inset 160 is slightly deeper than the landscape inset 166. When a card 18 is set in either of the insets 160 or 166 and the mount 100 is closed, the card 18 is confronted by the transparent plate 20 such that even further movement of the card 18 is minimized. Movement of the card 18 is minimized along the "x, y, and z" axes.

Figure 15:
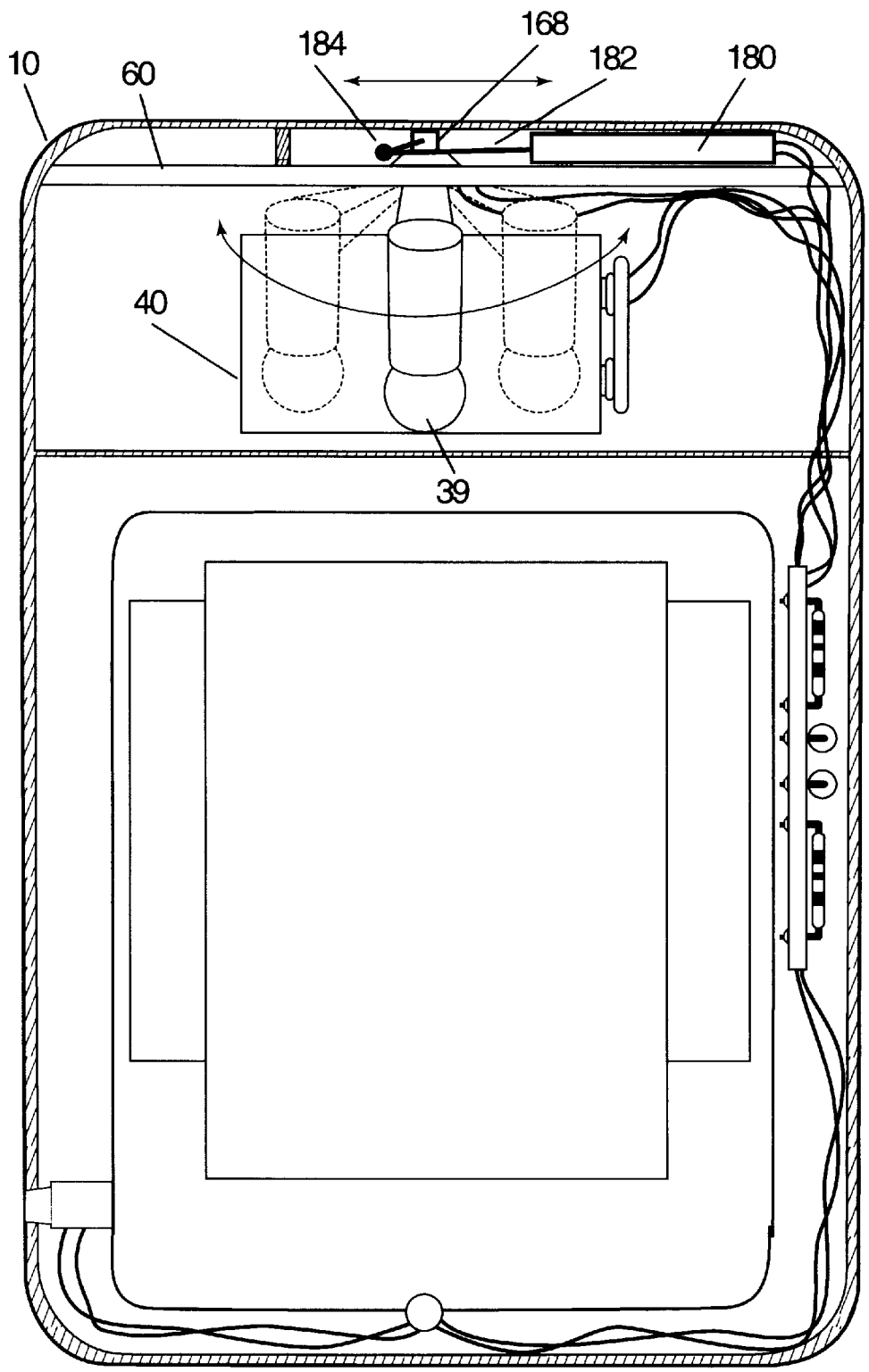
FIG. 15 shows another embodiment of the portable novelty card lighting device having the swinging of a light source actuated by an electro/mechanical servo.

As shown schematically in FIG. 15, in an alternate embodiment of the invention a servo mechanism 180 may be used to actuate the lighting arrangement 38. The servo mechanism 180 may be fixed to and between outer sidewall 28 and cross member 60. The servo mechanism may include an extensible and retractable rod or member 182, which may be pivotably connected at a pivot 184 to another rod or member 186, which in turn is fixed to shaft 68 so as to rotate the shaft 68 upon extension or retraction of member 182. Extension and retraction of member 182 is electrically driven by the servo mechanism 180 which is controlled by the circuit board 36 and the on/off switch 44. Accordingly, movement of the light 39 (shuttling of the light 39 from side to side and changing the angle of the light beams relative to the plane of the hologram card 18) is accomplished by simply depressing the switch 44 which in such a case may be referred to as an actuator.

In operation, the mount or door 100 is opened by sliding the latch 120 to disengage the locking extensions 112 and 128 and then pulling outwardly. Then the novelty card 18 is set into either the portrait or landscape inset 160 or 166 and the door 100 is snapped closed such that the card 18 confronts the transparent panel 20. Then the switch 44 is touched or depressed (and released and the light 39 remains on) to turn on the light 39. Then the knob 70 is turned to pivot the light 39 such that the light 39 moves in an arc. Such an arc presents a side to side movement as well as an up and down movement. Such a change in position of the light 39 relative to the hologram card 18 presents the illusion of movement as shown in FIGS. 14A–14H. Further, the three-dimensional image of the hologram card 18 is enhanced by, for example, the light source 39 being adjacent to the hologram card 18, the hood 50 concentrating light from the light source 39 upon the card 18 and shielding such light from the eyes of the viewer, and the depth of the inner sidewall 30. The light 39 may be turned off by again depressing the switch 44 or, if the light 39 is inadvertently left on, by the timer of the circuit board 36.

It can be appreciated, as seen in FIG. 6, that the insets 160 and 166 may be covered with a cushioned material or fabric 190 such as felt to protect the hologram card 18. It can further be appreciated that the insets 160 and 166 may be slightly larger than a standard sized card or standard sized novelty card 18 so as to receive snugly therein a card 18 encased in a protective plastic sheath.

It can be appreciated that the device 10 may be mounted on a wall, such as by hanging the upper lug 142 on a hook on the wall.

It can be appreciated that the 9V adapter plug 46 on the side of the unit permits the user to connect the device or unit 10 to an AC outlet and use the device without battery power. The unit 10 may run on AC current or a single 9V battery, using a 9V bulb 39.

The unit 10 is preferably switched on and off by a single touch. It is preferred that the switch 44 be a touch sensitive switch.

It can be appreciated that the bulb 39 and battery 42 may be easily replaced by removing the rear housing portion 24.

Relative to the plane of a hologram card 18 in the portrait inset 60, it is preferred that the angle of a line from the middle portion of such a card 18 in the portrait inset 60 to the middle portion of the light bulb 39 is forty-five degrees, when the arm 74 of the lighting arrangement 38 is perpendicular relative to the portrait inset 60. It can be appreciated that such an angle decreases somewhat when the arm 74 is swiveled so as to shuttle the light 39 from side to side.

It can be appreciated that reflection of the light source 39 is minimal if any, with the above-described angle of forty-five degrees. A preferred material for the transparent plate 20 is plexiglas.

A preferred amount of time for the timer in the circuit board 36 is three minutes. Such provides for longer battery and bulb life. The circuit 36 has an internal switch for opening and closing circuit connections for and to the batter 42 and bulb 39.

It can further be appreciated that the jack 46 may be used for recharging the battery 42.

A great number of novelty cards exist. Paper or cardboard based cards having images may be used with the present device. These cards include the conventional sports card such as the baseball, football, basketball, or hockey card. These cards further include fantasy cards such as the Magic® line of cards. Cards which provide the appearance of depth to the image on the card are preferred for use with the present device. These preferred cards include cards such as hologram cards, magic eye cards or cards with variations in color so as to provide the appearance of different depths to the magic eye card, lenticular cards, and light refraction cards. Even more preferred are hologram cards.

Another feature of the present invention is a portable novelty card lighting device which includes a housing for holding the novelty card and having an opening for permitting the novelty card to be viewed; a light engaged with the housing to cast light upon the novelty card; a power arrangement engaged with the housing and being electrically connected to the light to light the light; and a receptor in the housing for the novelty card.

Another feature of the present invention is a portable hologram lighting device for a hologram card, with the hologram card having lateral and longitudinal edges and opposite faces, with the portable hologram lighting device including a housing for holding the hologram card and having an opening for permitting the hologram card to be viewed; a light engaged with the housing to cast light on the hologram card; a power arrangement engaged with the housing and being electrically connected to the light to light the light; and a mount for the hologram card and being generally aligned with the opening such that the hologram card is viewable when on the mount, with the mount having an inset, with the inset including elongate portions confronting respective elongate portions of the lateral and longitudinal edges of the card to minimize side to side movement of the card, and with the inset further having an elongate face portion confronting one of the faces of the hologram card.

Another feature of the present invention a portable hologram lighting device which includes a housing for holding the hologram card and having an opening for permitting the hologram card to be viewed, with the housing having a receptacle for engaging the card, with the receptacle defining a plane; a light engaged with the housing to cast light on the hologram card; a power arrangement engaged with the housing and being electrically connected to the light to light the light; and a hood engaged with the housing and covering at least a portion of the light such that the light is at least partially recessed in the hood and such that the light is out of view when the portable hologram lighting device is held at an arm's length with the plane defined by the receptacle being perpendicular to one's line of sight.

Another feature of the present invention is a portable hologram lighting device which includes a housing for holding the hologram card and having an opening for permitting the hologram card to be viewed; a light engaged with the housing to cast light on the hologram card; a power arrangement engaged with the housing and being electrically connected to the light to light the light; and a timer arrangement engaged with the housing and electrically connected with at least one of the light and power arrangement, with the timer arrangement having a switch which when opened turns off the light, with the timer arrangement sensing the amount of time the light has been lit and opening the switch after a predefined amount of time to turn off the light.

Another feature of the present invention is a portable hologram lighting device which includes a housing for holding the hologram card and having an opening for permitting the hologram card to be viewed, with the housing having a receptacle for engaging the hologram card, with the receptacle being generally aligned with the opening; a light engaged with the housing to cast light on the hologram card; a power arrangement engaged with the housing and being electrically connected to the light to light the light; and with the housing further including a frame disposed about the opening, with the frame having an outermost surface, and with the distance between the outermost surface and the mount being equal to or greater than the thickness of the thumb of an average sized adult whereby a greater illusion of depth is provided to the hologram card.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A portable novelty card lighting device, comprising, in combination:
   a) a housing for holding a novelty card and having an opening for permitting the novelty card to be viewed, with the housing further having an exterior portion;
   b) a light engaged with the housing to cast light upon the novelty card, with the light being movable to at least first and second positions such that the light is aimable at different portions of the novelty card;
   c) a power arrangement engaged with the housing and being electrically connected to the light to light the light; and
   d) an actuator on the exterior portion of the housing and connectable to the light to move the light to the first and second positions whereby different illusions of the novelty card are visible to a viewer without the viewer adjusting her line of sight such as by tilting the device or moving her head.

2. The portable novelty card lighting device of claim 1 wherein the housing includes lateral portions, with the light being movable to and between such lateral portions whereby light is more directly impinged upon different side portions of the novelty card.

3. The portable novelty card lighting device of claim 1 wherein the housing includes a portion adjacent to where the novelty card is held in the housing and another portion further away from where the novelty card is held in the housing, with the light being movable to and between such portions such that the light is movable toward and away from the novelty card.

4. The portable novelty card lighting device of claim 1 wherein the light is engaged to the housing with a swinging arrangement such that the light moves over an arc and such that light impingement angle on the card varies.

5. The portable novelty card lighting device of claim 1, wherein the actuator comprises a mechanical actuator, with the mechanical actuator extending from the exterior portion of the housing to the light.

6. The portable novelty card lighting device of claim 1 and further comprising a electro/mechanical servo between the actuator and the light to move the light.

7. The portable novelty card lighting device of claim 1 wherein the novelty card depth.

8. A portable novelty card lighting device, comprising, in combination:
   a) a housing having an opening for permitting the novelty card to be viewed, with the opening defining a front portion of the housing, and with the housing having a rear portion opposite of the front portion;
   b) a light engaged with the housing to cast light on the novelty card directly from the light to the novelty card;
   c) a power arrangement engaged with the housing and being electrically connected to the light to light the light;
   d) a mount for receiving the novelty card and being engaged to the housing such that the mount is movable into and out of alignment with the housing, with the mount having a first face portion for receiving the novelty card, with the mount having a first closed position where the mount is generally aligned with the opening and housing such that the novelty card is viewable through the opening, with the mount having a second opened position where the mount is positioned at least partially away from the opening and is out of alignment with the housing and where the first face portion is accessible to the hand;
   e) a transparent plate extending over at least a portion of the opening and confronting the mount and being engaged with the housing such that the novelty card is sandwiched between the transparent plate and the mount, wherein the mount is engagable with the housing in a first aligned position where the mount is spaced from and confronts the transparent plate and in a second out-of-alignment position where the mount is spaced at a less confronting position relative to the transparent plate; and
   f) wherein the mount is swingably engaged to the housing, and wherein the mount swings out to be adjacent the rear portion of the housing such that the novelty card is loaded into the device from behind the device.

9. The portable novelty card lighting device of claim 1 and further comprising a quick connect and disconnect arrangement between the mount and the housing, with the arrangement being connected in the first position and disconnected in the second position.

10. The portable novelty card lighting device of claim 1 wherein the housing lies in a first general in the second position and wherein the mount lies in a second general plane in second postion, and further comprising a stop a mechanism between the housing and the mount, with the stop mechanism preventing the first and second planes from being disposed at greater than a forty-five degree angle from each other whereby the chances are minimized that the novelty card will fall out of the mount when the mount is in the second, out of alignment position.

11. The portable novelty card lighting device of claim 1 wherein the mount is swingable into and out of the first and second positions.

12. The portable novelty card lighting device of claim 1 and further comprising a timer arrangement engaged with the housing and electrically connected with at least one of the light and power arrangement, with the timer arrangement having a switch which when opened turns off the light, with the timer arrangement sensing the amount of time the light has been lit and opening the switch after a predefined amount of time to turn off the light.

13. A portable novelty card lighting device, comprising, in combination:
   a) a housing having an opening for permitting the novelty card to be viewed, with the opening defining a front portion of the housing, and with the housing having a rear portion opposite of the front portion;
   b) a light engaged with the housing to cast light on the novelty card directly from the light to the novelty card;
   c) a power arrangement engaged with the housing and being electrically connected to the light to light the light;
   d) a mount for receiving the novelty card and being engaged to the housing such that the mount is movable into and out of alignment with the housing, with the mount having a first face portion for receiving the novelty card, with the mount having a first closed position where the mount is generally aligned with the opening and housing such that the novelty card is viewable through the opening, with the mount having a second opened position where the mount is positioned at least partially away from the opening and is out of alignment with the housing and where the first face portion is accessible to the hand;

e) a transparent plate extending over at least a portion of the opening and confronting the mount and being engaged with the housing such that the novelty card is sandwiched between the transparent plate and the mount, wherein the mount is engagable with the housing in a first aligned position where the mount is spaced from and confronts the transparent plate and in a second out-of-alignment position where the mount is spaced at a less confronting position relative to the transparent plate; and wherein the mount in the second opened position is closer to the rear portion of the housing than the front portion of the housing such that the novelty card is loaded into the device from behind the device.

14. The portable novelty card lighting device of claim 13 wherein the rear portion of the housing includes outer and inner peripheries and with the mount having an outer periphery, with the outer periphery of the mount being adjacent the inner periphery of the rear portion when the mount is in its closed position.

15. A portable novelty card lighting device, with a novelty card for the device having lateral and longitudinal edges and opposite faces, with the device comprising, in combination:

a) a housing having an opening for permitting the novelty card to be viewed, with the opening defining a front portion of the housing, and with the housing having a rear portion opposite of the front portion;

b) a light engaged with the housing to cast light on the novelty card;

c) a power arrangement engaged with the housing and being electrically connected to the light to light the light;

d) a mount for receiving the novelty card and being engaged to the housing such that the mount is movable into and out of alignment with the housing, with the mount having a first face portion for receiving the novelty card, with the mount having a first closed position where the mount is generally aligned with the opening and housing such that the novelty card is viewable through the opening, with the mount having a second opened position where the mount is positioned at least partially away from the opening and is out of alignment with the housing and where the first face portion is accessible to the hand; and e) wherein the amount comprises an inset, with the inset including elongate portions confronting respective elongate portions of the lateral and longitudinal edges of the card to minimize side to side movement of the card, and with the inset further having an elongate face portion confronting one of the faces of the novelty card.

16. The portable novelty card lighting device of claim 15 wherein the inset is formed generally in the shape of a crossing arrangement such that a novelty card of a given rectangular size may be disposed in either the portrait or landscape view.

17. The portable novelty card lighting device of claim 15 wherein the mount, comprises generally the form of a panel such that the novelty card lies at least partially within the panel and in a plane generally perpendicular to the panel, with the mount being swingably engaged with the housing and swingable away from the housing such that inset is accessible for the placement of a novelty card therein.

18. A portable novelty card lighting device, comprising, in combination:

a) a housing having an opening for permitting the novelty card to be viewed, with the opening defining a front portion of the housing, and with the housing having a rear portion opposite of the front portion;

b) a light engaged with the housing to cast light on the novelty card;

c) a power arrangement engaged with the housing and being electrically connected to the light to light the light;

d) a mount for receiving the novelty card and being engaged to the housing such that the mount is movable into and out of alignment with the housing, with the mount having a first face portion for receiving the novelty card, with the mount having a first closed position where the mount is generally aligned with the opening and housing such that the novelty card is viewable through the opening, with the mount having a second opened position where the mount is positioned at least partially away from the opening and is out of alignment with the housing and where the first face portion is accessible to the hand, with the mount defining a plane;

e) a hood engaged with the housing and covering at least a portion of the light such that the light is at least partially recessed in the hood and such that the light is out of view when the portable novelty card lighting device is held at an arm's length when the plane of the mount is perpendicular to one's line of sight; and f) wherein the light is movable relative to the hood.

19. A portable novelty card lighting device, comprising, in combination:

a) a housing having an opening for permittigng the novelty card to be viewed, with the opening defining a front portion of the housing, and with the housing having a rear portion opposite of the front portion;

b) a light engaged with the housing to cast light on the novelty card;

c) a power arrangement engaged with the housing and being electrically connected to the light to light the light;

d) a mount for receiving the novelty card and being engaged to the housing such that the mount is movable into and out of alignment with the housing, with the mount having a first face portion for receiving the novelty card, with the mount having a first closed position where the mount is generally aligned with the opening and housing such that the novelty card is viewable through the opening, with the mount having a second opened position where the mount is positioned at least partially away from the opening and is out of alignment with the housing and where the first face portion is accessible to the hand;

e) a transparent plate extending over at least a portion of the opening and confronting the mount and being engaged with the housing such that the novelty card is sandwiched between the transparent plate and the mount; and f) wherein the housing further comprises a frame disposed about the opening, with the frame having an outermost surface, and with both of the transparent plate and mount being recessed relative to the outermost surface and with the mount being positioned near the rear portion of the housing whereby a greater illusion of depth is provided cards which provide an illusion of depth.

20. A portable novelty card lighting device, comprising, in combination:
   a) a housing for holding the novelty card and having an opening for permitting the novelty card to be viewed, with the housing having an exterior portion and with the opening having a width;
   b) a light swingably engaged with the housing to cast light on the novelty card;
   c) an actuator on the exterior portion of the housing to actuate a swinging of the light;
   d) a power arrangement engaged with the housing and being electrically connected to the light to light the light;
   e) a mount having an inset for receiving the novelty card, with the mount comprising generally the form of a panel such that the novelty card lies at least partially within the panel and in a plane generally perpendicular to the panel, with the mount being swingably engaged with the housing and swingable away from the housing such that inset is accessible for the placement of a novelty card therein;
   f) a hood engaged with the housing for extending at least partially over the light such that the light is at least partially recessed in the hood, with the hood having a width generally at least the width of the opening such that light from the light is castable upon at least the width of a novelty card; and
   g) a transparent plate extending at least partially over the opening and being engaged to the housing, with the transparent plate confronting the inset of the mount such that the novelty card is sandwiched between the novelty card and the mount.

* * * * *